(12) United States Patent
Sachsenhauser et al.

(10) Patent No.: US 10,211,627 B2
(45) Date of Patent: Feb. 19, 2019

(54) POWER-NETWORK NOTE, VARIABLE TRANSFORMER AND METHOD OF OPERATING THE NODE

(71) Applicant: Maschinenfabrik Reinhausen GmbH, Regensburg (DE)

(72) Inventors: Andreas Sachsenhauser, Mallersdorf-Pfaffenberg (DE); Uwe Kaltenborn, Regensburg (DE); Thomas Schuster, Regensburg (DE)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 262 days.

(21) Appl. No.: 15/110,119

(22) PCT Filed: Feb. 18, 2015

(86) PCT No.: PCT/EP2015/053391
§ 371 (c)(1),
(2) Date: Jul. 7, 2016

(87) PCT Pub. No.: WO2015/124611
PCT Pub. Date: Aug. 27, 2015

(65) Prior Publication Data
US 2016/0352096 A1    Dec. 1, 2016

(30) Foreign Application Priority Data
Feb. 24, 2014 (DE) .......................... 10 2014 102 373

(51) Int. Cl.
*H02H 7/26* (2006.01)
*H02H 3/20* (2006.01)
(Continued)

(52) U.S. Cl.
CPC ................. *H02H 7/26* (2013.01); *H02H 3/20* (2013.01); *H02H 7/04* (2013.01); *H02H 7/055* (2013.01)

(58) Field of Classification Search
CPC   H02H 3/20; H02H 7/04; H02H 7/055; H02H 7/26
(Continued)

(56) References Cited

U.S. PATENT DOCUMENTS

| 3,600,664 A * | 8/1971 | Goldberg ................. G05F 1/30 323/263 |
| 2010/0001700 A1* | 1/2010 | Santos ...................... G05F 1/14 323/256 |
| 2015/0028978 A1 | 1/2015 | Bieringer |

FOREIGN PATENT DOCUMENTS

| DE | 876432 B | 5/1953 |
| DE | 102011005837 A | 9/2012 |

(Continued)

*Primary Examiner* — Kevin J Comber
(74) *Attorney, Agent, or Firm* — Andrew Wilford (57) ABSTRACT

A network node for a substation or a local network station has a control transformer with a primary side and a secondary side, an input line connected to the primary side, and an output line connected to the secondary side. A protective switch is provided in the input line or in the output line, and a sensor detects an electrical parameter in the input line or in the output line and generate a measurement signal. A controller coupled to the control transformer, to the protective switch, and to the sensor, serves to operate the control transformer in dependence on the measurement signal such that the control transformer has a predetermined transmission ratio and open the protective switch in dependence on the measurement signal as soon as the control transformer has the predetermined transmission ratio.

14 Claims, 2 Drawing Sheets

(51) Int. Cl.
*H02H 7/04* (2006.01)
*H02H 7/055* (2006.01)

(58) Field of Classification Search
USPC ......................................................... 361/91.1
See application file for complete search history.

(56) References Cited

FOREIGN PATENT DOCUMENTS

EP         1014528 A    6/2000
WO     2011032585 A    3/2011

* cited by examiner

POWER-NETWORK NOTE, VARIABLE TRANSFORMER AND METHOD OF OPERATING THE NODE

CROSS REFERENCE TO RELATED APPLICATIONS

This application is the US-national stage of PCT application PCT/EP2015/053391 filed 18 Feb. 2015 and claiming the priority of German patent application 102014102373.0 itself filed 24 Feb. 2014.

FIELD OF THE INVENTION

The invention relates to a network node for a power grid, in particular, for a substation or a local network station, to a control transformer for a network node of a power grid, and to a method of operating a network node.

BACKGROUND OF THE INVENTION

The power grid can be, for example, an integrated network, an interconnected energy grid, an interconnected electricity grid, an electrical energy network, a power supply grid, an electricity supply grid, or an electricity network, and it can have one or more, in particular three phases, for example, and/or it can be constructed as a ring network or as a meshed network or mesh network.

DE 10 2011 005 837 describes an electrical energy distribution node for an electrical power distribution grid, which electrical energy distribution node has a transformer 92 and an analysis module, and is a local network station with a medium voltage overvoltage protective circuit suitable for being connected to a ring cable of a medium voltage network. This document furthermore describes a high voltage network in connection to a medium voltage network via a power transformer. Connected to the medium voltage network is a ring cable that connects local network stations to each other, thereby forming an open ring. In this arrangement, a wind turbine is connected to a connection of the local network station on the low voltage side via a transformer 60. The wind turbine generates electric energy fed into the ring cable and thus into the medium voltage network via the low voltage connection of the local network station. It is provided that the two local network stations each have a medium voltage switchgear for connection to the ring cable of the medium voltage network. Connected to the medium voltage switchgear via a switch 91 is a transformer 92 that converts the medium voltage of the medium voltage network ranging between 1 kV and 50 kV into a low voltage of 220 V per phase, for example suitable for end users or end consumers, as the case may be. Connected to the transformer 92 is a low voltage distribution device that has a plurality of connections for the output of the low voltage of the transformer 92. It is provided that the medium voltage switchgear is equipped with three switch panels, specifically with a first ring cable switch panel for the input-side connection of the ring cable of the medium voltage network, a second ring cable switch panel for the output-side connection of the ring cable, and a transformer switch panel for the connection to the switch 91 and thus to the transformer 92. It is provided that the medium voltage switchgear is equipped with two switch actuators that act on switches 90d and 90e of the medium voltage switchgear. The switch actuators make it possible to switch on or switch off the respectively associated switch 90d or 90e, as the case may be. A further switch actuator switches the switch 91 on or off.

DE 10 2012 103 490 [US 2015/0028978] describes a distribution transformer for the voltage regulation of local networks having a main winding and a regulating winding with a plurality of winding taps, a tap regulating device for uninterrupted switching over between different winding taps of the distribution transformer, where at least one selector contact unit is arranged along a line with in each case a plurality of fixed selector contacts which are each electrically connected with the individual winding taps, where the fixed selector contacts are actuatable by two longitudinally displaceable, movable selector contacts, where two vacuum switching tubes for each phase are provided for uninterrupted switching over, where a motor drive for introducing a drive movement into the tap regulating device is provided, and where the at least one selector contact unit and the switching means for the uninterrupted switching-over are directly actuatable by means of the common motor drive such that the introduction of the drive movement of the motor drive into the at least one selector contact unit and the switching means for the uninterrupted switching-over is carried out without interposition of an energy accumulator.

A local network station customarily consists of a high voltage switchgear or overvoltage protective circuit—also referred to as RMU, the abbreviation of the term "ring main unit"—and a transformer and a low voltage switching device or secondary side switching device. The transformer is usually designed as an oil transformer with an oil tank filled with oil and that accommodates the active part of the transformer. When integrating a tap changer into a transformer, which then is a control transformer, and in particular when arranging the tap changer within the oil tank, the user assumes that a sufficient reliability of the switching component is achieved in order to ensure a maintenance-free and safe operation for at least twelve months or even for at least 25 years. The overvoltage protective circuit also located in the local network station, has a considerably lower switching frequency and has protective switches for the protection of the transformer, which protective switches are often designed as a switch-fuse combination. Separation of the transformer and the overvoltage protective circuit is common nowadays in order to ensure access to the fuse for the purpose of changing the fuse. The very high currents in an earth fault, a short circuit, or a stroke of lightning, in particular, put a heavy strain on the load switches of the overvoltage protective circuit.

The object of the invention is to create a network node for a power grid, a control transformer for a network node of a power grid, and a method of operating a network node that enable lower strain and less wear on a protective switch for the control transformer, in particular in a release by earth fault, short circuit, or stroke of lightning.

This object is fulfilled by a network node, a control transformer, and a method according to the independent claims. Advantageous developments and embodiments are described in the dependent claims.

According to a first aspect of the invention, there is proposed a network node for a power grid, having or comprising a control transformer with a primary side and a secondary side;
a primary line or input line connected to the primary side;
a secondary line or output line connected to the secondary side;
a protective switch in the input line or in the output line;
a sensor that can detect an electrical parameter in the input line and/or in the output line and generate at least one corresponding measurement signal;

a controller coupled to the control transformer, to the protective switch, and to the sensor, and is formed such that it can operate the control transformer in dependence on the measurement signal in such a manner that the control transformer has a predetermined and/or predeterminable and/or specified and/or specifiable and/or suitable transmission ratio; it can operate the protective switch in dependence on the measurement signal in such a manner that the protective switch opens;

with the protective switch opening effected by control, being carried out as soon as or after the control transformer has the predetermined transmission ratio.

In a fault event, such as an earth fault, a short circuit, or a stroke of lightning, which can be identified by the controller by means of the sensor, the control transformer can, for example by setting a suitable transmission ratio, for example reduce the current that is too high, and is flowing through the, as yet, not released and thus closed protective switch. The proposed control transformer thus enables lower strain and less wear on the protective switches, in particular in a release by earth fault, short circuit, or stroke of lightning, for example.

The proposed network node can be constructed as a substation, for example coupled to an extra-high voltage network or high voltage network on the primary side and to a high voltage network or medium voltage network on the secondary side, or as a local network station coupled to a medium voltage network on the primary side and to a low voltage network on the secondary side.

The proposed network node can be formed in any manner as required and can comprise or have, for example, at least one additional or further control transformer and/or at least one additional or further input line and/or at least one additional or further output line and/or at least one additional or further protective switch and/or at least one additional or further sensor and/or at least one additional or further controller. Preferably, an input line and an output line is provided for each phase of a three-phase alternating current network. If at least one additional or further sensor is present, the controller is preferably also coupled to these and formed such that the operation of the control transformer is carried out in dependence on at least one of the measurement signals that originate from the coupled sensors, and/or operation of the protective switch is carried out in dependence on at least one of the measurement signals that originate from the coupled sensors.

Each control transformer can be formed in any manner as required and can have a one-phase or a three-phase design, for example, and/or it can be primary-side and/or secondary-side regulatable. The control transformer preferably comprises at least one regulator for changing or regulating the transmission ratio and furthermore, preferably on the primary side and/or on the secondary side each, at least one regulating winding with at least two taps that are connected to the regulator. Each regulator can, in particular, comprise at least one on-load tap changer and/or at least one semiconductor switch, in particular a power semiconductor switch, and it can be coupled to the controller. In the instance of the network node being a local network station, the control transformer can be a voltage regulation distribution transformer or VRDT, for example.

Each control transformer can be formed as one of the control transformers proposed according to the second aspect, for example.

Each protective switch can be formed in any manner as required and comprise at least one disconnect switch and/or at least one circuit breaker, for example. Preferably, the network node comprises at least one circuit protection device that comprises at least one of the protective switches and also comprises at least one release device or actuating device that can actuate at least one of the protective switches, and/or which comprises at least one of the sensors that is coupled to at least one of the actuating devices.

Each disconnect switch and/or each circuit breaker can be formed in any manner as required and can comprise at least one vacuum switch and/or at least one SF6 gas switch and/or at least one air pressure switch and/or at least one oil switch and/or at least one low oil switch and/or at least one semiconductor switch, for example.

Each sensor can be formed in any manner as required and can detect, for example, the current or the voltage or the phase shift or the power factor or the active factor or the displacement factor as an electrical parameter, and can generate a corresponding measurement signal.

Each controller can be formed in any manner as required, for example such that the predetermined, suitable transmission ratio corresponds to a predetermined or specified protection concept. The protection concept can be selectable and/or freely selected as required, for example, as an overcurrent protection concept, in which a current that is too high, is reduced or avoided in the line that is equipped with the respective protective switch, or as an overvoltage protection concept, in which a voltage that is too high, is reduced or avoided on the line that is equipped with the respective protective switch, or as an undervoltage protection concept, in which a voltage that is too low, is increased or avoided on the line that is equipped with the respective protective switch, or as a combination of at least two of these protection concepts.

In the instance of an overcurrent protection concept for the primary side or for the input line, that is, if a protective switch is in the input line, a suitable transmission ratio can be, for example, greater than the present transmission ratio and preferably be the maximum transmission ratio; if the present transmission ratio already is the maximum transmission ratio, then the suitable transmission ratio can be the maximum transmission ratio. This is because a greater transmission ratio corresponds to a lower current on the primary side.

In the instance of an overcurrent protection concept for the secondary side or for the output line, that is, if a protective switch is in the output line, a suitable transmission ratio can be, for example, less than the present transmission ratio and preferably be the minimum transmission ratio; if the present transmission ratio already is the minimum transmission ratio, then the suitable transmission ratio can be the minimum transmission ratio. This is because a smaller transmission ratio corresponds to a lower current on the secondary side.

In the instance of an overvoltage protection concept for the primary side or for the input line, that is, if a protective switch is in the input line, a suitable transmission ratio can be, for example, less than the present transmission ratio and preferably be the minimum transmission ratio; if the present transmission ratio already is the minimum transmission ratio, then the suitable transmission ratio can be the minimum transmission ratio. This is because a smaller transmission ratio corresponds to a lower voltage on the primary side.

In the instance of an overvoltage protection concept for the secondary side or for the output line, that is, if a protective switch is in the output line, a suitable transmission ratio can be, for example, greater than the present transmission ratio and preferably be the maximum transmission ratio; if the present transmission ratio already is the maximum transmission ratio, then the suitable transmission ratio can be the maximum transmission ratio. This is because a greater transmission ratio corresponds to a lower voltage on the secondary side.

The suitable transmission ratio preferentially depends on the characteristics or on the characteristic parameters of the respective protective switch. If there is a first protective switch with a first short circuit withstand capability and a second protective switch with a second short circuit withstand capability that is greater than the first short circuit withstand capability, for example, it is thus possible that a first transmission ratio, for which the control transformer requires a first period of time, is suitable for the first protective switch, and a second transmission ratio, for which the control transformer requires a second period of time that is greater than the first period of time, is suitable for the second protective switch.

It can be provided that the controller is formed such that operation of the protective switch is carried out after operation of the control transformer.

The time interval between operation of the control transformer and control of the protective switch is preferentially selected to be at least as great as a switching time of the control transformer, which switching time the control transformer requires for switching from one tap or step to an adjacent tap or step, for example, in the instance of the control transformer being formed as a tapped transformer with on-load tap changer.

It can be provided that the controller is formed such that operation of the protective switch is carried out prior to or simultaneously with operation of the control transformer;

the protective switch is coupled to a delay means that delays the opening of the protective switch.

The delay means can be formed in any manner as required and, in the instance of the protective switch being actuated by a relay, it can be a coil, for example switched in series with the exciter coil of the relay, and/or it can comprise a capacitor connected in parallel with the exciter coil of the relay.

It can be provided that each of the proposed network nodes comprises a primary switchgear or overvoltage protective circuit, comprising at least one of the protective switches in the input line;

two primary connections or input connections;

two further protective switches that each connect one of the input connections to that end of the input line that is not connected to the primary side.

Via the input connections, the network node can be integrated into a power grid that is constructed as a ring network or a mesh network, for example.

Each protective switch can be formed in any manner as required and comprise at least one disconnect switch and/or at least one circuit breaker and/or at least one disconnector and/or at least one load switch, for example. Each disconnect switch can be, for example, a disconnect switch or a vacuum load switch that, due to the vacuum tube employed, manages 10 short circuit switch-ons and 10 short-circuit switch-offs in 1000 load switchings.

It can be provided that each of the proposed network nodes comprises at least one filter coupled to the input line and/or to the output line and comprises, in particular, a dynamic filter and/or an active filter; and/or at least one capacitor bank connected to the input line and/or to the output line; and/or at least one energy accumulator coupled to the input line and/or preferably to the output line and comprises, in particular, an electrical energy accumulator and/or a chemical energy accumulator and/or a thermal energy accumulator and/or a compressed air reservoir.

Each of the proposed network nodes can be used for carrying out one of the proposed methods, for example, and/or it can carry out or can carry out one of the proposed methods and/or it can serve for and/or be suitable for carrying out and/or for being able to carry out one of the proposed methods.

According to a second aspect of the invention, there is proposed a control transformer for a network node of a power grid where the network node is formed, in particular, like one of the network nodes proposed according to the first aspect, comprising a primary side and a secondary side;

a primary line or input line connected to the primary side;

a secondary line or output line connected to the secondary side;

a protective switch in the input line or in the output line;

a sensor that can detect an electrical parameter in the input line and/or in the output line and generate at least one corresponding measurement signal;

a regulator for changing or adjusting or regulating the transmission ratio;

a controller coupled to the regulator, to the protective switch, and to the sensor, and that is formed such that it can control the regulator in dependence on the measurement signal in such a manner that the control transformer has a predetermined and/or predeterminable and/or specified and/or specifiable and/or suitable transmission ratio;

it can operate the protective switch in dependence on the measurement signal in such a manner that the protective switch opens;

with the protective switch opening by the controller, being carried out as soon as or after the control transformer has the predetermined transmission ratio.

In a fault event, such as an earth fault, a short circuit, or a stroke of lightning that can be identified by the controller by means of the sensor, the regulator can, by setting a suitable transmission ratio, for example reduce the current that is too high, and that is flowing through the, as yet, not released and thus closed protective switch. The proposed control transformer thus enables lower strain and less wear on the protective switches, in particular in a release by earth fault, short circuit, or stroke of lightning, for example.

The proposed control transformer can be formed in any manner as required and can have a one-phase or a three-phase design, for example, and/or it can be primary-side and/or secondary-side regulatable. On the primary side and/or the secondary side, the control transformer preferably comprises in each case at least one regulating winding with at least two taps that are connected to the regulator. Alternatively or additionally, the control transformer can comprise or have, for example, at least one additional or further input line and/or at least one additional or further output line and/or at least one additional or further protective switch and/or at least one additional or further sensor and/or at least one additional or further regulator and/or at least one additional or further controller. Preferably, an input line and an output line is provided for each phase of a three-phase alternating current network. If at least one additional or further sensor is present, the controller is preferably also coupled to these and formed such that control of the regulator is carried out in dependence on at least one of the measurement signals that originate from the coupled sensors, and/or operation of the protective switch is carried out in dependence on at least one of the measurement signals that originate from the coupled sensors. In the instance of the network node being a local network station, the control transformer can be a voltage regulation distribution transformer or VRDT, for example.

Each input line can, in particular, be at least a part of one of the input lines of the network node. Each output line can, in particular, be at least a part of one of the output lines of the network node. Each protective switch can, in particular, be at least a part of one of the protective switches of the network node. Each sensor can, in particular, be at least a part of one of the sensors of the network node. Each regulator can, in particular, be at least a part of one of the regulators of the network node. Each controller can, in particular, be at least a part of one of the controllers of the network node.

Each regulator can be formed in any manner as required and comprise at least one on-load tap changer and/or at least one semiconductor switch, in particular a power semiconductor switch, for example.

It can be provided that each of the proposed control transformers comprises
a primary switchgear or overvoltage protective circuit, comprising
at least one of the protective switches in the input line;
two primary connections or input connections;
two further protective switches that each connect one of the input connections to that end of the input line that is not connected to the primary side.

Each overvoltage protective circuit can, in particular, be at least a part of one of the overvoltage protective circuits of the network node.

It can be provided that each of the proposed control transformers comprises
a housing holding an active part of the control transformer and the regulator;
with
the protective switch and/or the overvoltage protective circuit being arranged in the housing.

A better space utilization is thereby made possible in the network node that has such a control transformer arranged in it.

This integration into the housing results in particularly useful embodiments, in which the switching unit of the on-load tap changer and the protective switch are brought spatially close together. As a consequence, it is possible that the actuator for the on-load tap changer and the actuator for the protective switches are integrated into one common actuator. In addition, the control computer of the on-load tap changer can take over control of all switching units.

If the control transformer is formed as an oil transformer with an oil tank, the housing can be the oil tank, for example.

It can be provided that
the control transformer comprises on its inside at least one temperature sensor that can generate a temperature signal, and/or at least one pressure sensor that can generate a pressure signal;
the controller is coupled to each temperature sensor and/or to each pressure sensor and that is formed such that it can control at least one of the protective switches in dependence on at least one of the temperature signals and/or in dependence on at least one of the pressure signals in such a manner that the protective switch opens.

This opening is preferentially carried out instantly or immediately or without delay.

The temperature sensor can comprise a bimetal switch or a thermometer with a device that releases upon a violation of the limiting value, for example.

If the control transformer comprises a housing, the temperature sensors and/or the pressure sensors are preferentially arranged in the housing.

According to a third aspect of the invention, there is proposed a method of operating a network node for a power grid where the network node is formed, in particular, like one of the network nodes proposed according to the first aspect, comprising
a control transformer with a primary side and a secondary side, which control transformer is formed, in particular, like one of the control transformers proposed according to the second aspect;
a primary line or input line connected to the primary side;
a secondary line or output line connected to the secondary side;
a protective switch in the input line or in the output line;
with
at least one electrical parameter in the input line or in the output line being monitored and/or measured and/or detected;
if at least one of the parameters meets an error criterion, the control transformer being controlled in a step a), in particular in dependence on at least one of the parameters, in such a manner that the control transformer has a predetermined and/or predeterminable and/or specified and/or specifiable and/or suitable transmission ratio, and
the protective switch being opened in a step b), in particular in dependence on at least one of the parameters;
the opening of the protective switch being carried out in step b) as soon as the control transformer has the predetermined transmission ratio.

In a fault event, such as an earth fault, a short circuit, or a stroke of lightning that can be identified by the monitoring, the control transformer can, for example by setting a suitable transmission ratio, for example reduce the current that is too high, and that is flowing through the, as yet, not released and thus closed protective switch. The proposed method thus enables lower strain and less wear on the protective switches, in particular in a release by earth fault, short circuit, or stroke of lightning, for example.

The proposed method can be designed in any manner as required, for example such that the predetermined, suitable transmission ratio corresponds to a predetermined or specified protection concept. The protection concept can be selectable and/or freely selected as required, for example, as an overcurrent protection concept or as an overvoltage protection concept or as an undervoltage protection concept or as a combination of at least two of these protection concepts.

The proposed method enables operating one of the proposed network nodes, for example.

Each electrical parameter can be freely selected as required, for example as the current or the voltage or the phase shift or the power factor or the active factor or the displacement factor. The monitored parameters can be combined and analyzed in any manner as required in order to obtain or determine or calculate a further, not directly monitored or measured or detected parameter, for example.

From the two parameters current and phase shift, the voltage, for example, can be determined as a further parameter.

The error criterion can be freely selected as required and can test whether the parameter is greater than a first threshold value and/or whether the parameter rate of change is greater than a second threshold value, for example.

It can be provided that a first control signal is sent to the control transformer in a step c) for the purpose of controlling the control transformer in step a); and/or a second or the first control signal is sent to the protective switch in a step d) for the purpose of opening the protective switch in step b).

It can be provided that step d) is carried out after step c).

It can be provided that step d) is carried out prior to or simultaneously with step c);

the opening of the protective switch is delayed in step b).

It can be provided that the temperature and/or the pressure on the inside of the control transformer is monitored;

if the temperature meets an error criterion and/or if the pressure meets an error criterion, then the protective switch is opened.

This opening is preferentially carried out instantly or immediately or without delay.

The explanations and exemplifications regarding one of the aspects of the invention, in particular regarding individual features of this aspect, also apply correspondingly for the other aspects of the invention.

BRIEF DESCRIPTION OF THE INVENTION

In the following, embodiments of the invention are explained in detail by means of the attached drawings. The individual features thereof are, however, not limited to the individual embodiments but can be connected and/or combined with individual features described further above and/or with individual features of other embodiments. Each example in the illustrations is provided by explanation, not limitation of the invention. The reference characters included in the claims are by no means intended to limit the scope of protection, but rather merely refer to the embodiments shown in the figures, in which

SPECIFIC DESCRIPTION OF THE INVENTION

Figure 1:
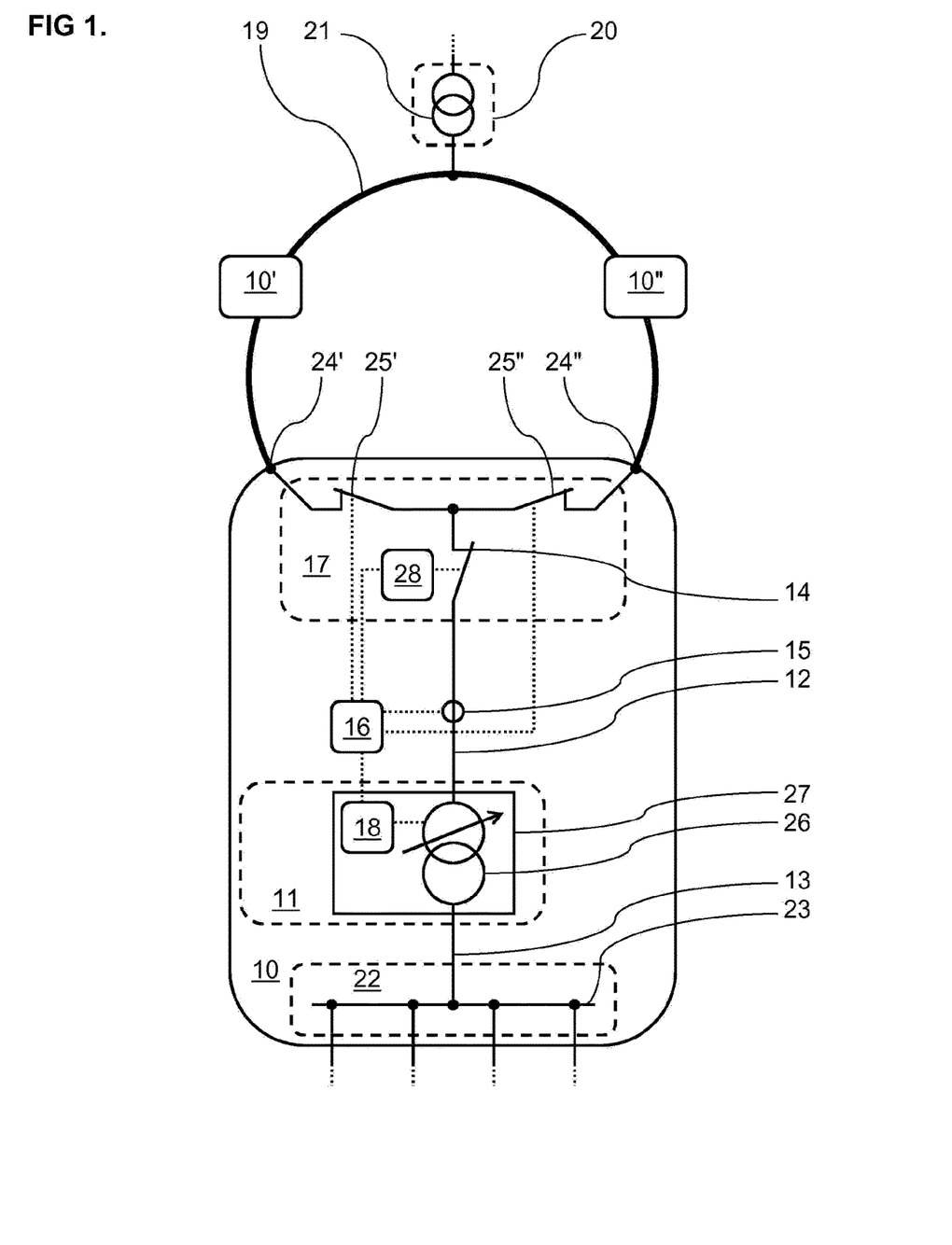
FIG. 1 shows a first embodiment of a network node integrated into a ring-shaped power grid.

Schematically illustrated in FIG. 1 is a first embodiment of a network node 10 for a power grid 19. The power grid 19 is exemplarily an interconnected medium voltage grid in a ring network topology fed via a substation 20 with a power transformer 21 from a not illustrated interconnected high voltage grid, and into which interconnected medium voltage grid a plurality of network nodes 10, 10', 10'' are integrated, of which only the network node 10 is illustrated in more detail.

In this embodiment, the network node 10 comprises a control transformer 11 with a primary side and a secondary side; an input line 12 connected to the primary side; an output line 13 connected to the secondary side; a protective switch 14 in the input line 12; a sensor 15 that can detect an electrical parameter in the input line 12 and can generate a measurement signal; a controller 16 coupled to the control transformer 11, to the protective switch 14, and to the sensor 15; and a secondary side distribution device 22 that exemplarily is a low voltage distribution device.

In this embodiment, the network node 10 in addition comprises a overvoltage protective circuit 17 that exemplarily is a medium voltage switchgear and that comprises the protective switch 14, two input connections 24', 24'', and two further protective switches 25', 25'' that are coupled to the controller 16. The network node 10 is integrated into the ring-shaped power grid 19 via the input connections 24', 24'' by each of the input connections 24', 24'' being connected via one of the protective switches 25', 25'' to the end of the protective switch 14 that is distant from the control transformer 11 and thus to the end of the input line 12 that is not connected to the primary side.

The control transformer 11 exemplarily is a voltage regulation distribution transformer, which is also referred to as VRDT, and which comprises an active part 26, a regulator 18 for changing the transmission ratio of the control transformer 11, and a housing 27, in which the active part 26 and the regulator 18 are positioned. The regulator 18 is connected to the primary side of the active part 26, which primary side comprises for each phase of the power grid 19 a not illustrated regulating winding that has a plurality of taps; it is coupled to the controller 16 for the purpose of control; and it exemplarily is an on-load tap changer.

The secondary side distribution device 22 comprises a bus bar 23 with a plurality of connections by which, for example, the energy consumers, such as households, can draw the low voltage generated by the network node 10, and/or energy producers, such as photovoltaic systems and wind turbines, can feed their generated electric energy into the power grid 19.

The sensor 15 exemplarily is a current sensor and formed as a current transformer such that it detects the current in the input line 12 as a parameter and can generate a current signal as a measurement signal.

The controller 16 can control the regulator 18 and thus the control transformer 11 in dependence on the current signal in such a manner that the control transformer 11 has a transmission ratio that corresponds to a specified protection concept and that is thus predetermined and suitable, and can operate the protective switch 14 in dependence on the measurement signal in such a manner that the protective switch opens, with the protective switch 14 opening by the controller, being carried out as soon as or after the control transformer 11 has the predetermined transmission ratio. The protective switch 14 opening by the controller, is thus carried out delayed by a time interval in relation to operation of the control transformer 11.

An overcurrent protection concept is exemplarily stored in the controller 16 as a protection concept. In the instance that the present transmission ratio is the maximum transmission ratio, the controller 16 determines the maximum transmission ratio as the suitable transmission ratio according to this overcurrent protection concept; and it otherwise determines that transmission ratio as the suitable transmission ratio that is the next greater transmission ratio in relation to the present transmission ratio.

In this embodiment, the controller 16 is formed such that operation of the protective switch 14 is carried out simultaneously with operation of the control transformer 11, and delays the opening of the protective switch 14 by a predetermined time interval if the protective switch 14 is coupled to a delay means 28. The protective switch 14 is exemplarily actuated by a not illustrated relay, and the delay means 28 exemplarily comprises a not illustrated coil switched in series with the exciter coil of the relay. The predetermined time interval is selected such that the control transformer 11 can switch over to the suitable transmission ratio.

A first embodiment of a method of operating a network node 10 for a power grid 19 will be explained in more detail below, where the network node 10 exemplarily is the network node 10 shown in FIG. 1.

In this embodiment, the current in the input line 12 is monitored. This is exemplarily carried out by means of the sensor 15 and the controller 16. The monitoring is carried out, for example, such that it is tested whether the current is greater than a threshold value corresponding to the specified overcurrent protection concept and thus is a predetermined threshold value, and whether it therefore fulfills an error criterion.

If this test shows that this is the case, that is, if the current fulfills the error criterion, then the control transformer 11 is controlled in a step a) such that it has the predetermined, suitable transmission ratio, and the protective switch 14 is opened in a step b). This is exemplarily carried out by means of the controller 16.

For the purpose of controlling the control transformer in step a), a first control signal is sent to the regulator 18 and thus to the control transformer 11 in a step c). This is exemplarily carried out by means of the controller 16.

For the purpose of opening the protective switch 14 in step b), the first control signal is sent to the protective switch 14 in a step d), and step d) is carried out simultaneously with step c). This is exemplarily carried out by means of the controller 16.

The opening of the protective switch 14 is delayed in step b). This is exemplarily carried out by means of the delay means 28. Consequently, the opening of the protective switch 14 is carried out in step b) as soon as or after the control transformer 11 has the predetermined transmission ratio.

Figure 2:
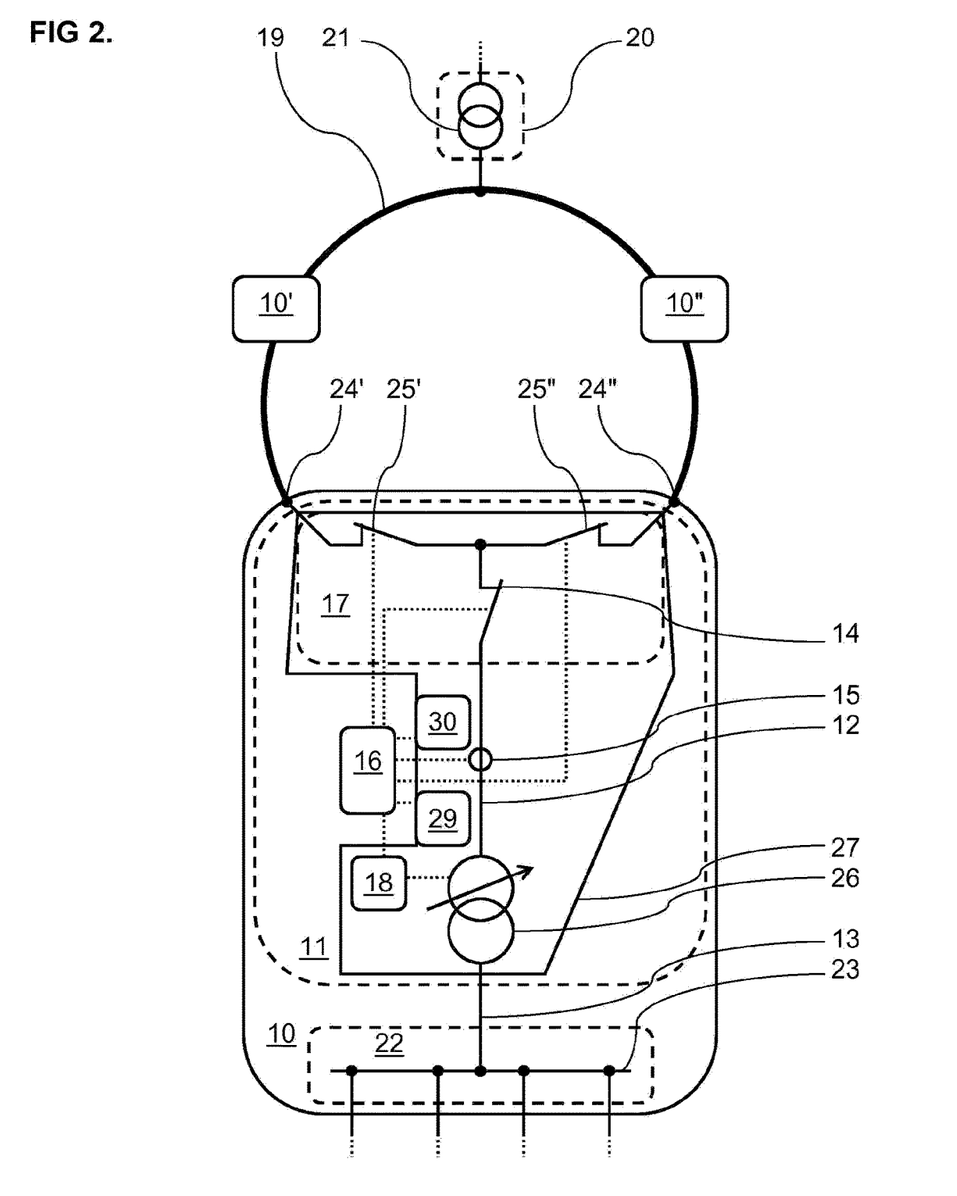
FIG. 2 shows a second embodiment of a network node for a power grid, which network node comprises a preferred embodiment of a control transformer.

Schematically illustrated in FIG. 2 is a second embodiment of a network node 10 for a power grid 19. This second embodiment resembles the first embodiment so that primarily the differences will be explained below.

In this embodiment, the control transformer 11 is formed according to a preferred embodiment, and the delay means 28 is omitted.

The control transformer 11 exemplarily comprises the input line 12; the output line 13; the protective switch 14; the sensor 15; the controller 16; the overvoltage protective circuit 17; a temperature sensor 29 that can generate a temperature signal; and a pressure sensor 30 that can generate a pressure signal. The control transformer 11 is designed as an oil transformer, and its housing 27 is a hermetically closed oil tank filled with oil and that accommodates the input line 12, the sensor 15, the overvoltage protective circuit 17, the temperature sensor 29, and the pressure sensor 30.

The controller 16 is coupled to the temperature sensor 29 and to the pressure sensor 30, and it is can operate the protective switch 14 in dependence on the temperature signal in such a manner that the protective switch 14 instantly opens if, for example, the temperature on the inside of the housing 27 exceeds a predetermined threshold value, and in dependence on the pressure signal if, for example, the pressure on the inside of the housing 27 exceeds a predetermined threshold value.

In this embodiment of the network node 10, the controller 16 is formed such that operation of the protective switch 14 is carried out offset by the predetermined time interval after operation of the control transformer 11. A delay means 28, such as in the first embodiment of the network node 10, is therefore not required.

A second embodiment of a method of operating a network node 10 for a power grid 19 will be explained in more detail below, where the network node 10 exemplarily is the network node 10 shown in FIG. 2. This second embodiment resembles the first embodiment so that primarily the differences will be explained below.

In this embodiment, a second control signal is sent to the protective switch 14 in step d), and step d) is carried out after step c). This is exemplarily carried out by means of the controller 16.

In step b), the protective switch 14 opens instantly or immediately or without delay after receiving the second control signal. Since step d) is carried out after step c), the opening of the protective switch 14 is carried out in step b) as soon as or after the control transformer 11 has the predetermined transmission ratio.

The invention claimed is:

1. A network node for a substation or a local network station, the node comprising:
   a control transformer with a primary side and a secondary side;
   an input line connected to the primary side;
   an output line connected to the secondary side;
   a protective switch in the input line or in the output line;
   a sensor for detecting an electrical parameter in the input line or in the output line and generate a measurement signal; and
   a controller coupled to the control transformer, to the protective switch, and to the sensor, and serving to
   operate the control transformer in dependence on the measurement signal such that the control transformer has a predetermined transmission ratio, and
   open the protective switch in dependence on the measurement signal as soon as the control transformer has the predetermined transmission ratio.

2. The network node according to claim 1, further comprising the step of:
   the controller opening the protective switch after operation of the control transformer.

3. The network node according to claim 1, further comprising the step of:
   the controller the protective switch prior to or simultaneously with operation of the control transformer, the node further comprising:
   delay means coupled to the protective switch for delaying opening of the protective switch.

4. The network node according to claim 1, further comprising;
   an overvoltage protective circuit having
   the protective switch in the input line;
   two input connections; and
   two further protective switches that each connect a respective one of the input connections to an end of the input line not connected to the primary side.

5. The network node according to claim 1, further comprising:
   a filter coupled to the input line or to the output line and being a dynamic filter or an active filter; or
   a capacitor bank connected to the input line or to the output line; or
   an energy accumulator coupled to the input line or to the output line and having an electrical energy accumulator or a chemical energy accumulator or a thermal energy accumulator or a compressed air reservoir.

6. A control transformer for a network node of a power grid, the network node comprising:
- a primary side and a secondary side;
- an input line connected to the primary side;
- an output line connected to the secondary side;
- a protective switch in the input line or in the output line;
- a sensor for detecting an electrical parameter in the input line or in the output line and generate a measurement signal;
- a regulator for changing a transmission ratio; and
- a controller coupled to the regulator, to the protective switch, and to the sensor, and serving to
  - control the regulator in dependence on the measurement signal such that the control transformer has a predetermined transmission ratio and
  - open the protective switch in dependence on the measurement signal as soon as the control transformer has the predetermined transmission ratio.

7. The control transformer according to claim 6, further comprising:
- a primary side overvoltage protective circuit having the protective switch in the input line;
- two input connections; and
- two further protective switches that each connect a respective one of the input connections to an end of the input line that is not connected to the primary side.

8. The control transformer according to claim 6, further comprising:
- a housing holding
  - an active part of the control transformer,
  - the regulator, and
- the protective switch or a primary side overvoltage protective circuit.

9. The control transformer according to claim 6, wherein
- the control transformer has an internal temperature sensor for generating a temperature signal, or a pressure sensor for generating a pressure signal; and
- the controller is coupled to the temperature sensor or to the pressure sensor and serves to open the protective switch in dependence on the temperature signal or in dependence on the pressure signal.

10. A method of operating a network node for a power grid wherein the network node comprises
- a control transformer with a primary side and a secondary side;
- an input line connected to the primary side;
- an output line connected to the secondary side; and
- a protective switch in the input line or in the output line;

the method comprising the steps of:
- monitoring an electrical parameter in the input line or in the output line and,
- if the parameter meets an error criterion, then
  - controlling the control transformer in dependence on the parameter such that the control transformer has a predetermined transmission ratio, and
  - opening the protective switch in dependence on the parameter as soon as the control transformer has the predetermined transmission ratio.

11. The method according to claim 10, further comprising the steps of:
- sending a first control signal to the control transformer controlling the control transformer; or
- sending a second control signal or the first control signal to the protective switch on opening the protective switch.

12. The method according to claim 11, wherein the second control signal is sent after the first control signal is sent.

13. The method according to claim 11, further comprising the steps of:
- sending the second control signal prior to or simultaneously with sending the first control signal, and
- delaying opening of the protective switch.

14. The method according to claim 10, further comprising the steps of:
- monitoring a temperature or a pressure inside of the control transformer; and,
- if the monitored temperature meets an error criterion or if the monitored pressure meets an error criterion, opening the protective switch.

* * * * *